United States Patent [19]

Paakkinen

[11] Patent Number: 4,718,839

[45] Date of Patent: Jan. 12, 1988

[54] APPARATUS FOR PRODUCING A CONCRETE PRODUCT PRESTRESSED IN AT LEAST TWO DIRECTIONS

[75] Inventor: Ilmari Paakkinen, Helsinki, Finland

[73] Assignee: OY Partek AB, Toijala, Finland

[21] Appl. No.: 822,427

[22] PCT Filed: Apr. 1, 1985

[86] PCT No.: PCT/FI85/00033

§ 371 Date: Nov. 27, 1985

§ 102(e) Date: Nov. 27, 1985

[87] PCT Pub. No.: WO85/04361

PCT Pub. Date: Oct. 10, 1985

[30] Foreign Application Priority Data

Apr. 2, 1984 [FI] Finland ................................. 841311

[51] Int. Cl.[4] ........................ B29C 39/14; B29C 45/26

[52] U.S. Cl. ........................................ 425/111; 249/83; 425/122; 425/223

[58] Field of Search ............... 425/111, 122, 101, 505, 425/506, 224, 363, 88, 223; 249/83, 85, 96, 97, 155; 264/256, DIG. 84

[56] References Cited

U.S. PATENT DOCUMENTS

| | | | |
|---|---|---|---|
| 1,457,999 | 6/1923 | Pedersen | 249/83 |
| 2,569,231 | 9/1951 | Danhof | 425/111 |
| 2,607,099 | 8/1952 | Schröder et al. | 425/111 |
| 2,950,517 | 8/1960 | Brickman | 264/35 |
| 3,283,385 | 11/1966 | Oakden | 425/111 |
| 3,694,118 | 9/1972 | Crowder | 425/111 |
| 4,069,285 | 1/1978 | Morgan | 264/DIG. 84 |
| 4,321,024 | 3/1982 | Terraillon | 425/111 |

*Primary Examiner*—Willard E. Hoag

*Attorney, Agent, or Firm*—Fitch, Even, Tabin & Flannery

[57] ABSTRACT

A method of and a casting bed for producing a concrete product, especially an endless concrete blank prestressed in at least two directions. In order to enable a prestressing wire to be arranged in position and tightened in a simpler manner, at least one prestressing wire is passed in a zigzag-like manner crosswise between at least two fixed sides of a casting bed to form a wire net and the wire net is tightened from a third side of the casting bed in the direction of both first-mentioned sides so that the wire net is stretched in two directions by means of a traction in one direction. Finally, concrete is fed on the bed to form a prestressed concrete blank. An apparatus intended for carrying out the method comprises a weaving device for stretching the prestressing wires continuously and in a zigzag-like manner crosswise between two parallel sides of the casting bed and for tightening of the wires in the longitudinal direction of the casting bed.

5 Claims, 5 Drawing Figures

Figure 1:
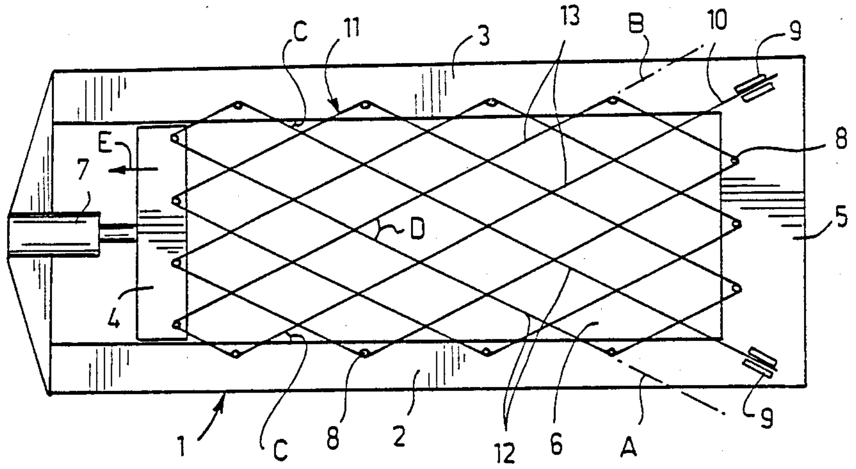

APPARATUS FOR PRODUCING A CONCRETE PRODUCT PRESTRESSED IN AT LEAST TWO DIRECTIONS

This invention relates to a method of producing a concrete product prestressed in at least two directions, according to which method at least one prestressing wire is mounted in a zigzag-like manner between sides of a casting bed to extend in two crossing directions for forming of a net, the wires are subjected to prestressing, and concrete is fed in said bed to form a prestressed concrete blank.

It is previously known to arrange the prestressing wires of a reinforcement on a casting bed so that said wires extend between the sides of the casting bed in at least two crossing directions obliquely with respect to the main directions of the casting bed, e.g. the length and the width thereof. By tensioning the wires, a prestressed, netlike reinforcement is provided in the casting bed. A concrete product prestressed in this way is advantageous if the concrete is required to be extremely firm and possess high non-cleaving properties in different directions of the product.

USSR Inventor's Certificate No. 139,968 discloses a single mould for producing a prestressed concrete product. A four-side mould with fixed sides is provided with supporting studs pivoted on said mould for a prestressing wire. The wire is passed around the supporting studs to extend in a zigzag-like manner between the opposite sides so that a netlike structure is obtained. After the concrete has hardened, rods attached to the supporting studs are heated electrically so that the supporting studs turn inwards and are released from the prestressed wire.

A disadvantage of such mode of reinforcing is the complicated structure of the mould, because each of the four sides of the mould must be provided with pivotable supporting studs. When the wire is passed around the supporting studs, it must be tensioned in four different directions, before the reinforcing net is completed. In addition, the electrical use of such mould requires certain special measures to be taken. The suggested mode of prestressing cannot be applied in continuous casting of an endless concrete blank in order to provide prestressing in two directions, because an endless casting bed comprises two sides only.

SE Patent Specification No. 113,712 discloses a conical mould for producing a prestressed concrete mast. The mould comprises a stationary end plate and a movable end plate, prestressing wires passed between the plates in a zigzag-like manner to form a sleeve-like reinforcing net. The wires are tensioned by displacing the movable end plate away from the stationary end plate.

A disadvantage of such mode of reinforcing is that it mainly provides prestressing in the longitudinal direction of the mould only, whereas no prestressing is provided in the transversal direction of the conical mould. The suggested mode of prestressing cannot, either, be used for continuous casting of an endless concrete blank, because the sides of the casting bed, which support the wires extending there between, must be stationary.

The object of the present invention is to provide a method which avoids the aforementioned disadvantages and which enables a prestressing wire to be mounted in position as well as tensioned in a simpler manner. This object is achieved by means of a method according to the invention, which is characterized in that said prestressing wire is passed crosswise between at least two opposite stationary sides of the casting bed and is tensioned from a third side of the casting bed in parallel with said two sides.

The invention is based on the idea that when the prestressing wire or wires are arranged to extend mutually crosswise between at least two sides of the casting bed, a netlike structure is obtained which provides prestressing in two, almost perpendicular directions when tensioned from a third side of the casting bed. Therefore, two stationary sides are enough in the casting bed for mounting of the prestressing wire and, nevertheless, prestressing is provided essentially both in the longitudinal and transversal direction of the finished concrete product. Consequently, also a continuous or an endless casting bed comprising only two longitudinal sides can be simply provided with a reinforcement prestressed in two directions. The mode of prestressing according to the invention is especially suitable for continuous casting, because fastening of the wire or wires on the casting bed is easy and quick, and the weaving and prestressing of the wires is easy to carry out automatically.

The invention is also concerned with a casting bed suitable for carrying out said method, which casting bed is characterized by a four-sided single mould, whereby the sides (2–5) are provided with means (8) for supporting crossing tendon wires (12, 13) formed by a prestressing wire (10) or wires and extending obliquely between said sides, characterized in that one side (4) of the mould is displaceable away from the opposite stationary side (5). According to the invention a casting bed for an endless concrete product prestressed in two directions is formed by a two-sided, continuous trough-like mould, characterized in that the sides (30, 31) of the mould are provided with means (8) for supporting crossing tendon wires (35, 36) formed by a prestressing wire (27) or wires and extending obliquely between said sides.

The invention is also concerned with an apparatus for continuous casting, which apparatus is suitable for carrying out said method and comprises apparatus for continuously casting an endless concrete product prestressed in two directions, comprising a continuous casting bed with open ends and two parallel longitudinal sides, means for tensioning of prestressing wires on the casting bed, a feeding device for supplying concrete in the casting bed, and a displacing device for displacing said casting bed under the feeding device.

Said apparatus is characterized in that said apparatus is provided with a weaving device displaceable with respect to said casting bed in the longitudinal direction thereof for mounting of said prestressing wires in a netlike manner on the longitudinal sides of the casting bed to extend continuously in a zigzag-like manner, obliquely and crosswise between said sides of the casting bed.

Figure 2:
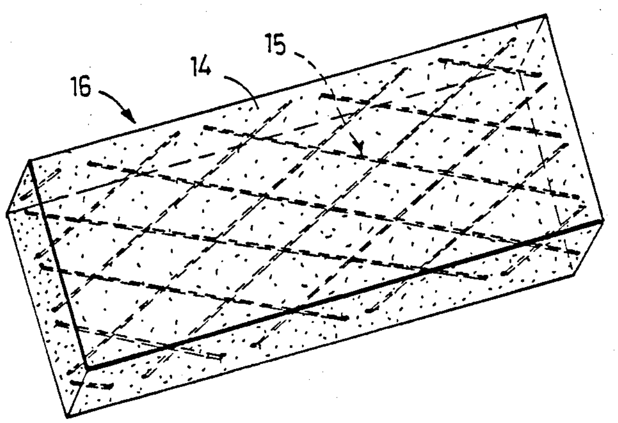
Figure 5:
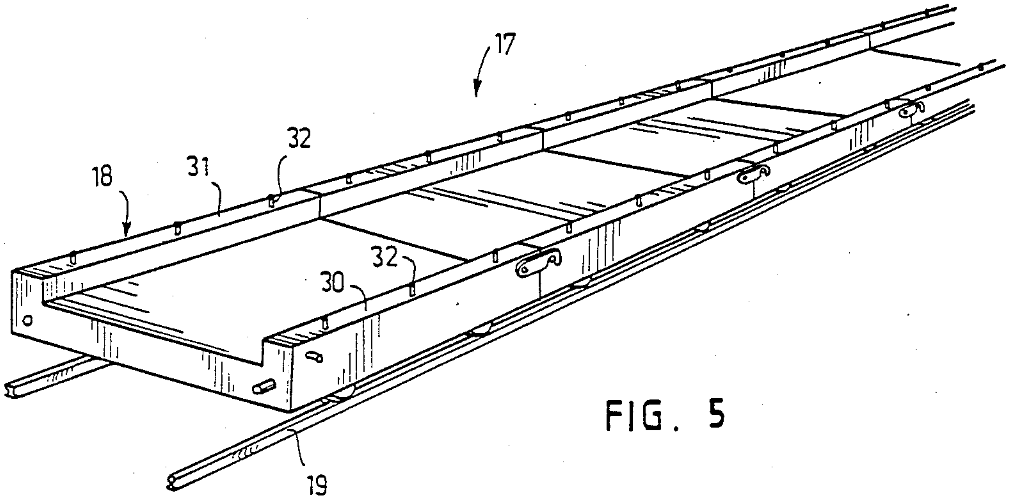
Figure 3:
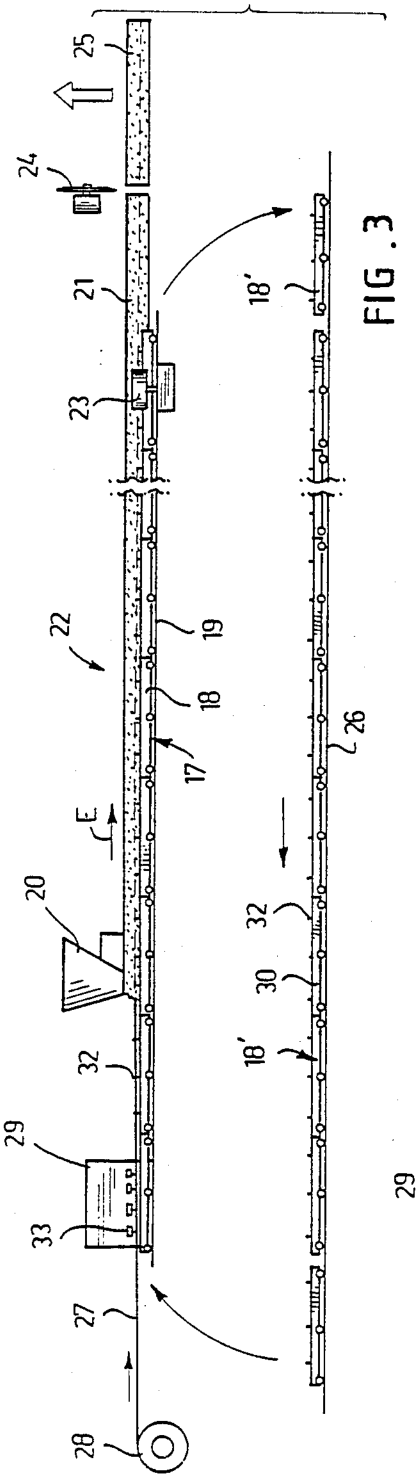
Figure 4:
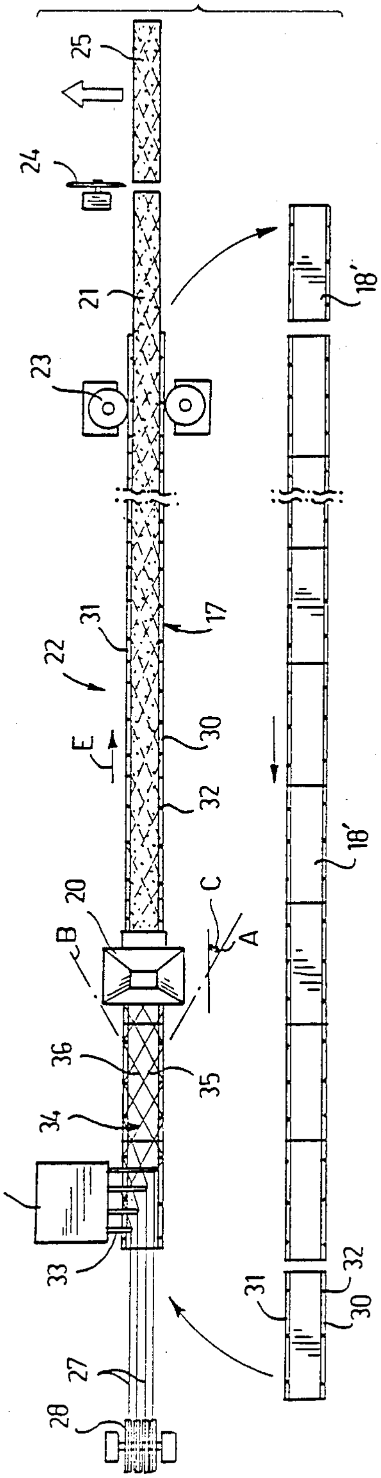

The invention will be described more closely in the following with reference to the attached drawings, wherein FIG. 1 is a top view of an application of the method according to the invention in single mould casting, FIG. 2 is a perspective view of a cast concrete product, FIGS. 3 and 4 are a schematical side and top view respectively of an apparatus for continuous casting according to the invention, and FIG. 5 is a perspective view of a casting bed according to the invention.

FIG. 1 of the drawings illustrates a mould 1 for single casting, comprising two parallel longitudinal sides 2, 3 and two transversal sides 4, 5 perpendicular to said sides 2, 3, whereby a rectangular casting space 6 is formed between said sides.

The sides of the mould are stationary with the exception of one side which is connected to a pulling device 7, by means of which said side 4 can be displaced in a direction away from the opposite side. The upper edges of the sides are provided with mutually-spaced vertical studs 8. Both corners of one end of the mould are provided with clamping jaws 9.

According to the invention, one prestressing wire 10 is passed around the vertical studs in the form of a regular net 11 consisting of meshes having the shape of a parallelogram, as shown in FIG. 1. The front end of the wire is fastened in one clamping jaw and the tail thereof in the other clamping jaw. The wire extends in a zigzag-like manner between the sides and forms two groups of tendon wires 12, 13 extending in different directions A and B, whereby the tendon wires in both groups extend obliquely in parallel with each other between opposite sides. Therefore, the tendon wires form a sharp angle C with respect to the longitudinal sides. The tendon wires in both groups can form a sharp or a right angle D with each other.

The net is tensioned by pulling the movable side 4 by means of the pulling device in the longitudinal direction E of the mould to such an extent that the tendon wires 12, 13 are provided with a desired prestressing. Thereafter the mould is filled with concrete up to a desired level in a manner known per se.

After the concrete has hardened, the net portions protruding from the concrete are cut off and the concrete block 16, FIG. 2, comprising a concrete body 14 and a prestressed reinforcement 15 is removed from the mould.

FIGS. 3 and 4 of the drawings illustrate an apparatus for continuous casting of a concrete product. The apparatus comprises a horizontal casting bed 17 formed by mould carriages 18 which are interconnected one after another into a sequence and are displaceable on wheels along stationary rails 19. A stationary feeding and compacting device 20 for concrete is mounted above the casting bed. The device feeds concrete on the casting bed which moves thereunder so as to form a concrete blank 21 continuously filling up the mould carriages. The feeding device is followed by a hardening zone 22 for the concrete blank and, further, a pulling device 23 which grips either the hardened concrete blank or the mould carriage and pulls the casting bed continuously forward. Disconnecting and removing of the mould carriages are effected after the pulling device. Finally, a cutting device 24 is mounted on the path of movement of the concrete blank for cutting off concrete pieces 25 of a desired length from the concrete blank.

A mould carriage 18′, disconnected and removed from the casting bed, is guided along a return rail 26 back to the feeding end of the casting bed and connected to the end of the casting bed before the feeding device to form a fixed extension of said casting bed.

Four prestressing wires 27 are passed from retarded wire reels 28 through a weaving device 29 to the mould bed to extend crosswise between the longitudinal sides of the casting bed. For this purpose, the sides 30, 31 of the casting bed are provided with uniformly spaced vertical studs 32.

Said weaving device comprises four stretching arms 33, whereby each wire is passed through a guiding means provided at the end of its own arm. The stretching arms are connected to machinery, not shown, which moves the arms in a reciprocating manner synchronized with the advancing of the casting bed so that each wire is fixed alternately on different sides of the casting bed to extend in a zigzag-like manner across the casting bed. Thereby the weaving device fastens all the wires with a mutual displacement on the casting bed to form a regular net 34 having meshes of the shape of a parallelogram. The net comprises two groups of crossing tendon wires 35, 36 which in both groups extend obliquely in parallel with each other between the opposite sides so that the tendon wires form a sharp angle C with respect to the longitudinal sides of the casting bed.

When the concrete blank is pulled forwards by means of the pulling device, a desired prestressing of the prestressing wires is maintained despite the operation of the weaving device, because said prestressing wires are stationary engaged with the hardened concrete blank. In other words, the wires are already prestressed when they are mounted on the vertical studs of the casting bed.

It is noted that also in this embodiment the concrete blank is provided with prestressing in two directions A, B by tensioning the wires in the longitudinal direction E of the casting bed only. By means of the weaving device, the arrangement of the prestressing wires on the vertical studs of the casting bed can be carried out automatically.

The drawings and the description related thereto are only intended to illustrate the idea of the invention. In their details, the concrete product according to the invention and the method, casting bed and casting apparatus developed for producing said product can vary within the scope of the claims. Although the above presentation mainly concerns two-dimensional reinforcement, it is also possible according to the invention to form the reinforcement as a three-dimensional net which is stressed in three directions when tensioned in the axial direction thereof. Instead of making the net shown in FIG. 1 of one continuous wire, it is possible to weave said net in advance and position the ready net on the vertical studs of the mould, whereafter the net is tensioned in the manner described above.

I claim:

1. A casting bed for a concrete product prestressed in two directions, the casting bed comprising a mould including four sides, the sides including means for supporting crossing tendon wire extending obliquely between said sides, three sides of the mould being stationary and one side of mould being displaceable away from an opposite stationary side to stress the wires for the formation of prestressed concrete which is stressed in two directions within the mould.

2. An apparatus for continuously casting an endless concrete product prestressed in two directions, comprising:

a continuous casting bed the bed including open ends and two parallel longitudinal sides generally normal to the open ends, the sides including means for engaging prestressed wire;

means for the continuous supply and tensioning of prestressed wire on the casting bed;

a feeding device for supplying concrete in the casting bed;

a displacing device for displacing said casting bed under the feeding device; and a weaving device for engaging the prestressed wire onto the wire engaging means on the sides of the bed and mounting the prestressed wire in a netlike manner in the casting bed extending the wire continuously in a zig-zag-like and crosswise manner between said sides of the casting bed to continously provide a prestressed concrete product prestressed in two directions.

3. An apparatus according to claim 2, wherein the the tensioning means includes retarded wire wheels, the prestressed wire extending from the retarded wheels into said weaving device.

4. In an apparatus for continuously casting prestressed concrete, a casting bed for an endless cured concrete product prestressed in two directions, the casting bed comprising:

a continuous, trough-like mould, the mould, the mould including two sides and means on the sides of the mould for engaging prestressed wire, the engaging means adapted to engage the wire such that the wire extends obliquely between the sides, the cured concrete at one end of the bed maintaining prestressing on the wire in the mould.

5. An apparatus according to claim 2 where the engaging means for wire on the sides of the bed are studs.

* * * * *